United States Patent
Ishibashi et al.

(10) Patent No.: US 6,423,125 B1
(45) Date of Patent: Jul. 23, 2002

(54) POLISHING COMPOSITION

(75) Inventors: Tomoaki Ishibashi; Noritaka Yokomichi; Hiroyasu Sugiyama, all of Aichi (JP)

(73) Assignee: Fujimi Incorporated, Nishikasugai-gun (JP)

( * ) Notice: Subject to any disclaimer, the term of this patent is extended or adjusted under 35 U.S.C. 154(b) by 2 days.

(21) Appl. No.: 09/648,483

(22) Filed: Aug. 28, 2000

(30) Foreign Application Priority Data

Sep. 21, 1999 (JP) .......................................... 11-266511

(51) Int. Cl.$^7$ .......................... C09K 3/14; C09K 13/04; G11B 5/84; H01L 61/304
(52) U.S. Cl. .......................... 106/3; 252/79.1; 252/79.2; 51/308; 51/309; 51/307
(58) Field of Search ................................ 206/3; 51/307, 51/308, 309; 252/79.1, 79.2

(56) References Cited

U.S. PATENT DOCUMENTS

| | | |
|---|---|---|
| 4,696,697 A | 9/1987 | Kitano et al. |
| 4,705,566 A | 11/1987 | Senda et al. |
| 4,915,710 A | 4/1990 | Miyazaki et al. |
| 5,997,620 A | 12/1999 | Kodama et al. ................ 106/3 |
| 6,280,489 B1 * | 8/2001 | Horie et al. .................... 51/309 |

OTHER PUBLICATIONS

Derwent Abstract, JP 5–032959, Feb. 9, 1993.
Derwent Abstract, JP 5–059351, Mar. 9, 1993.
Derwent Abstract, JP 5–112775, May 7, 1993.

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

A polishing composition for magnetic disk substrates to be used for memory hard disks, which comprises:

(a) water;
(b) at least one phosphate. compound selected from the group consisting of a phosphate ester of ethoxylated alkylalcohol and a phosphate ester of ethoxylated arylalcohol;
(c) at least one polishing accelerator selected from the group consisting of an inorganic acid and an organic acid, and their salts, other than the phosphate compound of component (b);
(d) at least one abrasive selected from the group consisting of aluminum oxide, silicon dioxide, cerium oxide, zirconium oxide, titanium oxide, silicon nitride and manganese dioxide.

21 Claims, No Drawings

POLISHING COMPOSITION

The present invention relates to a polishing composition suitable for final polishing of the surface of memory hard disks in the production of such memory hard disks i.e. magnetic disk substrates (hereinafter referred to simply as "substrates") to be used for memory devices useful for e.g. computers. More particularly, the present invention relates to a polishing composition which is capable of preventing formation of fine pits, microprotrusions and other surface defects with little surface residues in the final polishing in the process for producing various substrates represented by e.g. Ni—P disks, Ni—Fe disks, aluminum disks, boron carbide disks and carbon disks and which, at the same time, is capable of polishing such substrates to provide excellent polished surfaces useful for memory hard disks with high capacities and high recording densities. Memory hard disks which are one of memory devices for e.g. computers, tend to be small in size and large in capacity year after year, and a substrate which is most widely employed at present, is one having electroless Ni—P plating applied to a blank material. Here, the blank material is one having an aluminum or other base material for a substrate shaped by lathe processing by means of a diamond grinding wheel, by lapping by means of a PVA grinding wheel prepared by solidifying SiC abrasive material, or by other methods, for the purpose of imparting parallelism or flatness.

However, by such shaping methods, it is not possible to completely remove a relatively large waviness. And, the electroless Ni—P plating will be formed also along such waviness of the blank material, and the waviness tends to remain in the substrate. Polishing is carried out for the purpose of removing the waviness of the substrate and making the surface flat.

Further, along with the trend for high capacity of the memory hard disk, the recording density is being improved at a rate of a few tens % every year. Accordingly, a space on a memory hard disk occupied by a predetermined quantity of information recorded, tends to be increasing narrow, and the magnetic force required for recording tends to be weak. Accordingly, recently, it is required to minimize the flying height of the head, which is a space between the magnetic head and the memory hard disk. At present, the flying height of the head is reduced to a level of at most 1.0 microinch (about 0.025 $\mu$m).

Further, so-called texturing may sometimes be applied to form concentrically circular scorelines on the substrate after polishing, for the purpose of preventing sticking of a magnetic head for writing and reading information to a memory hard disk or preventing formation of scorelines in a certain direction different from the rotational direction of the memory hard disk on the substrate surface by polishing whereby the magnetic field on the memory hard disk tends to be non-uniform. Recently, for the purpose of further reducing the flying height, it has been proposed to carry out light texturing to form thinner scorelines on the substrate, or to use a non-textured substrate having no scorelines without carrying out texturing. A technology for supporting such a trend for a low flying height of a magnetic head, has been developed, and the trend for low flying height of a magnetic head has been further advanced.

The magnetic head flies along the surface shape of the memory hard disk which is rotating at a very high speed. If pits of a few $\mu$m are present on the surface of the memory hard disk, it may happen that information may not completely be written on the disk, thus leading to missing of information or failure in recording information, so-called "bit error", which causes an error.

Here, "pits" may be dents initially present in the substrate or dents formed on the substrate surface by polishing. Fine pits are dents with a diameter of less than about 10 $\mu$m, among them.

Accordingly, it is important to reduce the surface roughness of the substrate and at the same time necessary to completely remove a relatively large waviness, microprotrusions, pits and other surface defects, in the polishing process as a step prior to forming a memory hard disk.

For such a purpose, it has heretofore been common to employ single polishing finish by means of a polishing composition (hereinafter referred to also as a "slurry" from its nature) comprising aluminum oxide or other various abrasives, water and various polishing accelerators. For example, JP-B-64-436 and JP-B-2-23589 disclose a polishing composition for a memory hard disk, which is made into a slurry by adding and mixing e.g. aluminum nitrate, nickel nitrate or nickel sulfate as a polishing accelerator to water and aluminum hydroxide. Further, JP-B-4-38788 discloses an acidic polishing composition for an aluminum magnetic disk, which comprises water, a fine powder of alumina abrasive material, gluconic acid or lactic acid as a polishing accelerator, and colloidal alumina as a-surface improver.

However, with any one of such polishing compositions, it has been very difficult to satisfy, by single step polishing, all requirements to remove the surface defects or the relatively large waviness on the substrate surface, to reduce the surface roughness to a very low level in a predetermined period of time and to prevent formation of microprotrusions, fine pits and other surface defects. Accordingly, a polishing process comprising two or more steps, has been studied.

The desired degree of surface roughness is determined depending upon the process for producing the substrate, the final recording capacity as a memory hard disk and other conditions. Depending upon the desired degree of surface roughness, a polishing process may be employed which comprises more than two steps.

When the polishing process is carried out in two steps, polishing in the first step will be intended mainly for removing a relatively large waviness, large pits and other surface defects on the substrate surface, i.e. for adjusting the shape. Accordingly, a polishing composition which has a large correcting ability against the above-mentioned waviness or surface defects while minimizing deep scratches which may not be removed by the final polishing in the second step, rather than reducing the surface roughness, is required. Therefore, for the purpose of increasing the stock removal rate, an abrasive having a relatively large particle size is employed as the abrasive material in the composition.

Polishing in the second step i.e. the final polishing, is intended for minimizing the surface roughness of the substrate. Accordingly, the polishing composition is required to be able to minimizing the surface roughness and to prevent formation of microprotrusions, fine pits or other surface defects, rather than to have a large correcting ability against the large waviness or surface defects, which is required for the polishing in the first step.

Recently, in order to reduce the processing cost, an improvement has been made in the processing of the blank material by means of a PVA whetstone, and it is designed to reduce the surface roughness of the blank material prior to the use of a polishing composition, thereby to bring the quality, such as the surface roughness or waviness, of the substrate prior to polishing to a level of the quality after the polishing in the first step. If such processing is carried out, the polishing in the first step will be unnecessary, and only the so-called finish polishing may be necessary.

Therefore, as a means to reduce the surface roughness of the substrate, it has been common to employ an abrasive having a relatively small particle size as the abrasive material in the polishing composition or to use a polishing composition containing a surfactant, irrespective of polishing of the first step or the second step. For example, JP-A-5-32959 (prior art 1) discloses a polishing composition comprising water, an alumina abrasive and a fluorine type surfactant, JP-A-5-59351 (prior art 2) discloses a polishing composition for a metal material, which comprises water, an alumina abrasive, a water-soluble metal salt as a polishing accelerator and a fluorine type surfactant, or JP-A-5-112775 (prior art 3) discloses a polishing composition for a metal material, which comprises water, an alumina abrasive, a fluorine type surfactant and an amino acid.

However, as far as the present inventors are aware, when a polishing composition comprising an alumina abrasive having a relatively small particle size, particularly an average particle size of at most 2 μm, water, a water-soluble metal salt or an amino acid, and a fluorine-type surfactant, is employed, there has been a problem that the stock removal rate is very low and inadequate for practical production, and fine pits or scratches are likely to form, since the polishing ability of the composition is small.

Further, even if no defects such as pits will form, deposition of abrasive grains on the surface of the substrate which can not be removed by washing, or a residue which appears to be sticking, is likely to result, since the particle size of the abrasive is small. Accordingly, it has been difficult to obtain a sufficient surface quality.

It is an object of the present invention to solve the above problems and to provide a polishing composition which brings about less formation of surface residues as compared with conventional polishing compositions and which has a high stock removal rate and is capable of forming an excellent treated surface while preventing formation of fine pits, microprotrusions and other surface defects in final polishing of a substrate to be used for a memory hard disk.

The present invention provides a polishing composition for magnetic disk substrates to be used for memory hard disks, which comprises:

(a) water;
(b) at least one phosphate compound selected from the group consisting of a phosphate ester of ethoxylated alkylalcohol and a phosphate ester of ethoxylated arylalcohol;
(c) at least one polishing accelerator selected from the group consisting of an inorganic acid and an organic acid, and their salts, other than the phosphate compound of component (b);
(d) at least one abrasive selected from the group consisting of aluminum oxide, silicon dioxide, cerium oxide, zirconium oxide, titanium oxide, silicon nitride and manganese dioxide.

Now, the present invention will be described in detail. The following description is intended to facilitate the understanding of the present invention and by no means restricts the present invention.

Phosphate Compound

The phosphate ester of ethoxylated alkylalcohol and the phosphate ester of ethoxylated arylalcohol as one of the components of the polishing composition of the present invention, are phosphate compounds of alcohols obtainable from a reaction of an alcohol or a phenol derivative with ethylene oxide, and they may contain a monoester, a diester and a triester in optional proportions. Further, these phosphate compounds may be used in combination of a plurality of them in optional proportions within a range not to impair the effects of the present invention.

Further, the alkyl group of the phosphate ester of ethoxylated alkylalcohol preferably has a carbon number of from 12 to 18, and the aryl group of the phosphate ester of ethoxylated arylalcohol is preferably a phenyl group or a phenyl group having hydrogen on the benzene ring substituted by an optional substituent, more preferably a phenyl group or a phenyl group having hydrogen on the benzene ring substituted by a $C_{1-10}$ alkyl group.

The ethylene oxide addition mol (hereinafter referred to as "EO") of such a phosphate compound is not particularly limited, but it is preferably within a range of from 3 to 15. By controlling EO within the above range, it is possible to adjust the balance of the stock removal rate and the suppression of surface defects.

Further, the content of the phosphate compound in the polishing composition is usually from 0.001 to 2 wt %, preferably from 0.005 to 1 wt %, more preferably from 0.01 to 0.6 wt %, based on the total weight of the composition. If this content is increased, the surface residue on a polished substrate tends to decrease, or formation of fine pits and other surface defects tend to decrease. However, if it is increased too much, the stock removal rate or the processing ability is likely to deteriorate, and fine pits or scratches are likely to form. On the other hand, if the content is too small, the effect of the present invention to reduce the surface residue on the substrate or to suppress formation of pits and other surface defects, tends to be hardly obtainable.

Polishing Accelerator

Said at least one polishing accelerator selected from the group consisting of an inorganic acid and an organic acid, and their salts, other than the above mentioned phosphate compound, as one of components of the polishing composition of the present invention, may be at least one member which is selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid and citric acid, and their salts and derivatives. Specifically, it includes aluminum nitrate, nickel nitrate, lithium nitrate, sodium nitrate, potassium nitrate, iron(III) nitrate, sodium nitrite, potassium nitrite, aluminum sulfate, nickel sulfate, lithium sulfate, sodium sulfate, iron(III) sulfate, ammonium sulfate, aluminum chloride, iron(III) chloride, ammonium chloride, sodium molybdate, ammonium molybdate, nickel sulfamate and ammonium sulfamate. These polishing accelerators may be used in combination of a plurality of them in an optional ratio within a range not to impair the effects of the present invention.

The content of the polishing accelerator in the polishing composition varies depending upon the type of the polishing accelerator to be used. However, it is usually from 0.01 to 30 wt %, preferably from 0.1 to 25 wt %, more preferably from 0.5 to 20 wt %, based on the total weight of the composition. By increasing the content of the polishing accelerator, the stock removal rate tends to increase. However, if the content is excessive, the chemical action of the polishing composition tends to be strong, whereby microprotrusions, fine pits or other surface defects are likely to form on the surface of the substrate. On the other hand, if the content is too small, the stock removal rate tends to be small, and no adequate effect for suppressing fine pits, microprotrusions and other surface defects on the surface of the substrate, tends to be obtainable.

Abrasive

Main abrasive materials for the abrasive as one of components of the polishing composition of the present invention, are aluminum oxide, silicon dioxide, cerium oxide, titanium oxide, silicon nitride, zirconium oxide and manganese dioxide. These abrasives may be employed optionally in combination as the case requires. When they are used in combination, the manner of the combination or their proportions, are not particularly limited.

The alumina oxide includes, α-alumina, δ-alumina, θ-alumina, κ-alumina and other morphologically different ones. Further, there is a one so-called fumed alumina from the method for its preparation.

The silicon dioxide includes colloidal silica, fumed silica and various other types different in the nature or the method for preparation.

The cerium oxide includes trivalent and tetravalent ones from its oxidation number, and it includes hexagonal system, tesseral system and face centered cubic system ones from its crystal system.

The zirconium oxide includes monoclinic system, tetragonal system and amorphous ones from its crystal system. Further, there is one so-called fumed zirconia from the method for its preparation.

The titanium oxide includes titanium monoxide, dititanium trioxide, titanium dioxide and other types from its crystal system. Further, there is one so-called fumed titania from the method for its preparation.

The silicon nitride includes a-silicon nitride, β-silicon nitride, amorphous silicon nitride and other morphologically different ones.

The manganese dioxide includes α-manganese dioxide, β-manganese dioxide, γ-manganese dioxide, δ-manganese dioxide, ε-manganese dioxide, η-manganese dioxide and other morphologically different ones from its morphology.

The above-described abrasives are intended to polish the surface to be polished (i.e. the substrate surface) by the mechanical action as abrasive grains. Among them, the particle size of silicon dioxide is usually from 0.005 to 0.5 μm, preferably from 0.01 to 0.3 μm as an average particle size obtained from the surface area measured by a BET method. Likewise, the particle size of aluminum oxide, zirconium oxide, titanium oxide, silicon nitride or manganese dioxide is usually from 0.01 to 2 μm, preferably from 0.05 to 1.5 μm as an average particle size measured by a laser diffraction system particle size measuring apparatus LS-230 (manufactured by Coulter Co., U.S.A.). Further, the particle size of cerium oxide is usually from 0.01 to 0.5 μm, preferably from 0.05 to 0.45 μm as an average particle size observed by a scanning electron microscope. If the average particle sizes of these abrasives exceed the above respective ranges, there will be a problem such that the surface roughness of the polished surface tends to be substantial, or scratches are likely to be formed. On the other hand, if the average particle sizes are smaller than the respective ranges, the stock removal rate tends to be extremely low, such being not practical.

The content of the abrasive in the polishing composition is usually from 0.1 to 50 wt %, preferably from 1 to 25 wt %, based on the total weight of the composition. If the content of the abrasive is too small, microprotrusions, fine pits or other surface defects are likely to be formed on the substrate surface, and the stock removal rate may sometimes decrease. On the other hand, if it is too much, uniform dispersion in the polishing composition tends to be hardly maintained, and the viscosity of the polishing composition tends to be excessive, whereby the handling may sometimes tend to be difficult.

Water

As the water which is one of components of the polishing composition of the present invention, any one of industrial water, ion-exchanged water, distilled water, pure water and ultra pure water, may be employed. However, taking into consideration the stability of the polishing composition and undesirability of metal impurities in the polishing process, it is preferred to employ deionized water, ion-exchanged water, distilled water, pure water or ultra pure water, having such impurities removed as far as possible.

Polishing Composition

The polishing composition of the present invention is prepared usually by dispersing or dissolving the above respective components in water i.e. by mixing and dispersing an abrasive selected from the group consisting of aluminum oxide, silicon dioxide, cerium oxide, zirconium oxide, titanium oxide, silicon nitride and manganese dioxide in a desired content in water and further dissolving the phosphate compound and the polishing accelerator therein. The method for dispersing or dissolving these components in water is optional. For example, they may be dispersed by supersonic dispersion or by stirring by means of a vane-type stirrer.

For the purpose of stabilizing or maintaining the quality of the product, various known additives may further be added at the time of preparing the above polishing composition, depending upon the type of the object to be treated, the treating conditions or other necessity for polishing treatment.

Examples of such further additives include the following.
(a) Celluloses such as cellulose, carboxymethylcellulose and hydroxyethylcellulose,
(b) Water-soluble alcohols, such as ethanol, propanol and ethylene glycol,
(c) Organic polyanion materials, such as a lignin sulfonate and a polyacrylate,
(d) Water-soluble polymers (emulsifiers), such as polyvinyl alcohol,
(e) Chelating agents, such as dimethyl glyoxime, dithizone, oxine, acetylacetone, glycine, EDTA and NTA,
(f) Fungicides such as sodium arginate and potassium hydrogencarbonate, and
(e) Surfactants of carboxylic acid type or sulfonic acid type, defoaming agents of glycol type or silicone type, and dispersants of fatty acid type.

Further, the above-mentioned abrasive, the phosphate compound or the polishing accelerator, which is suitable for use in the polishing composition of the present invention, may be used as an auxiliary additive for the purpose other than the above-mentioned purpose, such as to prevent sedimentation of the abrasive.

The polishing composition of the present invention may be prepared in the form of a stock solution having a relatively high concentration, so that it may be stored or transported in that form, and may be diluted for use at the time of the actual polishing operation. The above-mentioned preferred range of concentrations is the one at the time of the actual polishing operation. When the composition is prepared in the form of such a stock solution, it is, of course, a liquid having a high concentration in the state where it is stored or transported. From the viewpoint of the handling efficiency, it is preferred that the composition is prepared in such a concentrated form.

With respect to the reason as to why the polishing composition of the present invention presents less surface residue and small surface roughness as compared with conventional polishing compositions containing an alkylbenzene sulfonate or a fluorine-type surfactant and is capable of reducing formation of fine pits, microprotrusions or other surface defects, while presenting a polished surface having a small surface roughness, a detailed mechanism is not clearly understood, but it may be explained as follows taking a Ni—P plated substrate as an example.

Firstly, the phosphate compound has a function to suitably flocculate abrasive particles, whereby small abrasive particles will be flocculated with a relative weak flocculating force. In general, fine pits tend to be formed, when the polishing ability of the polishing composition is low. However, with the polishing composition of the present invention, polishing particles having a relatively small particle size are flocculated with a relatively weak force, and this flocculation is gradually dissociated during the polishing treatment, whereby the damage to the treated surface is small, and the treated surface having a small surface roughness can be obtained. Further, surface defects such as fine pits (the portions where treating strains exist) will not selectively be treated to enlarge such defects by the mechanical action of the above-mentioned flocculated abrasive particles and the chemical action of the polishing accelerator, whereby a uniform treated surface can be obtained. And, it is considered that the surface of swarf formed by polishing or the abrasive in the composition is covered by the phosphate compound, whereby it tends to scarcely deposit on the surface of the substrate, and formation of surface defects such as microprotrusions will thereby be reduced.

When polishing treatment is carried out by the polishing composition of the present invention, it is preferred to carry out rinsing treatment by a rinsing composition having the abrasive removed from the polishing composition of the present invention, prior to and/or after the polishing treatment. By treating with the rinsing composition prior to the polishing treatment, the chemical effects of the polishing composition can be supplemented. Further, by treating with the rinsing composition after the polishing treatment, it will be possible to effectively remove swarf or various components of the polishing composition remaining on the surface of the substrate.

Now, the present invention will be described in further detail with reference to Examples. However, it should be understood that the present invention is by no means restricted to the specific constructions of such Examples which will be described below.

EXAMPLES 1 TO 7 AND COMPARATIVE EXAMPLES 1 TO 5

Preparation of Polishing Compositions

As an abrasive, aluminum oxide was dispersed in water by means of a stirrer to obtain a slurry having an abrasive concentration of 10 wt %. Then, a polishing accelerator and at least one phosphate compound selected from the group consisting of a phosphate ester of ethoxylated alkylalcohol and a phosphate ester of ethoxylated arylalcohol, as identified in Table 1, were added thereto in the amounts as identified in Table 1, followed by mixing to obtain polishing compositions of Examples 1 to 7 and Comparative Examples 1 to 5. In Comparative Examples 1 to 3, no phosphate compound was incorporated, and in Comparative Examples 4 and 5, instead of the phosphate compound, a sodium polystylensulfonate and a quaternary ammonium salt were, respectively, incorporated.

TABLE 1

|  | Polishing accelerator | Amount (wt %) | Phosphate compound* | Amount (wt %) |
|---|---|---|---|---|
| Ex. 1 | Aluminum nitrate | 1.0 | A | 0.1 |
| Ex. 2 | Aluminum nitrate | 1.0 | A | 0.2 |
| Ex. 3 | Aluminum sulfate | 0.5 | A | 0.1 |
| Ex. 4 | Succinic acid | 0.2 | A | 0.1 |
| Ex. 5 | Aluminum nitrate | 1.0 | B | 0.1 |
| Ex. 6 | Aluminum nitrate | 1.0 | C | 0.1 |
| Ex. 7 | Aluminum nitrate | 1.0 | D | 0.1 |
| Ex. 8 | Aluminum nitrate | 1.0 | E | 0.1 |
| Ex. 9 | Aluminum nitrate | 1.0 | F | 0.1 |
| Comp. Ex. 1 | Aluminum nitrate | 1.0 | — | — |
| Comp. Ex. 2 | Aluminum sulfate | 1.0 | — | — |
| Comp. Ex. 3 | Succinic acid | 1.0 | — | — |
| Comp. Ex. 4 | Aluminum nitrate | 1.0 | Sodium polystylen-sulfonate | 0.8 |
| Comp. Ex. 5 | Aluminum nitrate | 1.0 | Quaternary ammonium salt | 1.0 |

*A: Phosphate ester of ethoxylated nonylphenol (10EO)
B: Phosphate ester of ethoxylated nonylphenol (9EO)
C: Phosphate ester of ethoxylated dinonylphenol (10EO)
D: Phosphate ester of ethoxylated alkylalcohol (alkyl = C:12–15, 3EO)
E: Phosphate ester of ethoxylated alkylalcohol (alkyl = C:12–15, 6EO)
F: Phosphate ester of ethoxylated alkylalcohol (alkyl = C:12–15, 9EO)

Preparation of Substrates for Polishing Tests

Substrates for polishing tests using the polishing compositions of Example 1 to 7 and Comparative Example 1 to 5, were prepared. To evaluate the two step polishing (finish polishing), substrates for the polishing tests were prepared by carrying out firstly the first step polishing under the following conditions.

Polishing Conditions (first step)

Works: 3.5" electroless Ni—P substrate

Number of works: Ten disks

Polishing machine: Double side polishing machine (table diameter: 640 mm)

Polishing pad: Politex DG (manufactured by Rodel Inc., U.S.A.)

Treating pressure: 80 g/cm$^2$

Table revolutions: 60 rpm

Polishing composition: DISKLITE-3471 (manufacctured by FUJIMI INCORPORATED)

Dilution of the composition: 1:2 pure water

Feed rate of the polishing composition: 100 cc/min

Polishing time: 5 minutes

Polishing Test

Then, using the polishing compositions of Examples 1 to 7 and Comparative Examples 1 to 5, the second step polishing (finish polishing ) was carried out against substrates having the first step polishing completed, under the following conditions.

Polishing Conditions (second step)

Works: 3.5" electroless Ni—P substrate (first step polishing completed)

Number of works: Ten disks

Polishing machine: Double side polishing machine (table diameter: 640 mm)

Polishing pad: Polilex DG (manufactured by Rodel Inc., U.S.A.)

Treating pressure: 60 g/cm$^2$

Table revolutions: 60 rpm

Feed rate of the polishing composition: 100 cc/min

Polishing time: 5 minutes

After the polishing, the substrates were sequentially washed and dried, and by means of a differential interference microscope (magnification: 50 times), the substrate surfaces were inspected to measure the presence or absence of microprotrusions or fine pits. The evaluation standards were as follows, and the obtained results were as shown in Table 2.

⊙: No fine pits were visually observed.

○: No substantial fine pits were visually observed.

X: Fine pits were substantially visually observed, and they were regarded as a problematic level.

Further, by means of a scanning electron microscope (20,000 magnifications), the substrate surfaces were inspected, and the degree of the residue which appeared to be adsorption or sticking of abrasive grains, was visually evaluated. The evaluation standards were as follows, and the obtained results are as shown in Table 2.

⊙: No substantial residue was observed.

○: The residue was slightly observed, but it was not a practically problematic level.

X: The residue was substantially observed, and it was a practically problematic level.

TABLE 2

|  | Fine pits | Surface residue |
|---|---|---|
| Ex. 1 | ⊙ | ⊙ |
| Ex. 2 | ⊙ | ⊙ |
| Ex. 3 | ⊙ | ○ |
| Ex. 4 | ⊙ | ○ |
| Ex. 5 | ⊙ | ⊙ |
| Ex. 6 | ⊙ | ⊙ |
| Ex. 7 | ⊙ | ⊙ |
| Ex. 8 | ⊙ | ⊙ |
| Ex. 9 | ⊙ | ⊙ |
| Comp. Ex. 1 | X | X |
| Comp. Ex. 2 | X | X |
| Comp. Ex. 3 | X | X |
| Comp. Ex. 4 | ⊙ | X |
| Comp. Ex. 5 | ⊙ | X |

As is evident from Table 2, in Comparative Examples 1 to 3 wherein no phosphate compound was incorporated, the fine pits and the surface residue were substantially observed, and in Comparative Examples 4 and 5 wherein surfactants other than the phosphate compound were incorporated, the surface residue was substantially observed although formation of fine pits was prevented. Further, in the case of Comparative Examples 4 and 5, it was necessary to increase the amount of the surfactants to obtain the effect for preventing formation of fine pits. Whereas, in Examples 1 to 9 wherein the phosphate compounds were incorporated, formation of fine pits was prevented in each case, and no substantial surface residue was observed. It is evident from the results that with the polishing compositions of Examples 1 to 9, it is possible to obtain an excellent polished surface in the finish polishing.

As described in the foregoing, the polishing composition of the present invention is a polishing composition for magnetic disk substrates to be used for memory hard disks, which comprises (a) water, (b) at least one phosphate compound selected from the group consisting of a phosphate ester of ethoxylated alkylalcohol and a phosphate ester of ethoxylated arylalcohol, (c) at least one polishing accelerator selected from the group consisting of an inorganic acid and an organic acid, and their salts, other than the phosphate compound of component (b), and (d) at least one abrasive selected from the group consisting of aluminum oxide, silicon dioxide, cerium oxide, zirconium oxide, titanium oxide, silicon nitride and manganese dioxide.

It is thereby possible to obtain a polishing composition which scarcely forms a surface residue as compared with conventional polishing compositions, provides a large stock removal rate and is capable of preventing formation of fine pits, microprotrusions and other surface defects, in the finish polishing of substrates to be used for memory hard disks and which is capable of presenting an excellent polished surface.

The polishing composition of the present invention has a content of the phosphate compound of component (b) within a range of from 0.001 to 2 wt % based on the total weight of the composition, whereby it is possible to minimize formation of a residue on the surface of the polished substrate and to suppress formation of fine pits and other surface defects.

The polishing composition of the present invention has a content of the polishing accelerator of component (c) within a range of from 0.01 to 30 wt % based on the total weight of the composition, whereby it is possible to increase the stock removal rate and to suppress fine pits, microprotrusions and other surface defects on the surface of the substrate.

Further, the polishing composition of the present invention has a content of the abrasive of component (d) within a range of from 0.01 to 50 wt % based on the total weight of the composition, whereby it is possible to suppress formation of microprotrusions, fine pits and other surface defects on the surface of the substrates and to suppress a decrease of the stock removal rate, and it is possible to maintain the uniform dispersibility of the abrasive in the composition and to suppress an excessive increase of the viscosity of the composition.

The entire disclosure of Japanese Patent Application No. 11-266511 filed on Sep. 21, 1999 including specification, claims and summary are incorporated herein by reference in its entirety.

What is claimed is:

1. A polishing composition for magnetic disk substrates to be used for memory hard disks, which comprises:
   (a) water;
   (b) at least one phosphate compound selected from the group consisting of a phosphate ester of ethoxylated alkylalcohol and a phosphate ester of ethoxylated arylalcohol;
   (c) at least one polishing accelerator selected from the group consisting of an inorganic acid and an organic acid, and their salts, other than the phosphate compound of component (b); and
   (d) at least one abrasive selected from the group consisting of aluminum oxide, silicon dioxide, cerium oxide, zirconium oxide, titanium oxide, silicon nitride and manganese dioxide.

2. The polishing composition according to claim 1, wherein the polishing accelerator of component (c) is at least one member selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid and citric acid, and their salts and derivatives.

3. The polishing composition according to claim 2. wherein the polishing accelerator of component (c) is at least one member selected from the group consisting of aluminum nitrate, nickel nitrate, lithium nitrate, sodium nitrate, potassium nitrate, iron(III) nitrate, sodium nitrite, potassium nitrite, aluminum sulfate, nickel sulfate, lithium sulfate, sodium sulfate, iron(III) sulfate, ammonium sulfate, aluminum chloride, iron(III) chloride, ammonium chloride, sodium molybdate, ammonium molybdate, nickel sulfamate and ammonium sulfamate.

4. The polishing composition according to claim 1, wherein the phosphate compound of component (b) is a phosphate ester of ethoxylated aryl alcohol, wherein the aryl group is phenyl, nonylphenyl or dinonylphenyl or a mixture thereof, or a phosphate ester of ehtoxylates alkyl alcohol, wherein the alkyl group has a carbon number of from 12 to 18.

5. The polishing composition according to claim 1, wherein the phosphate compound of component (b) is a phosphate ester of ethylated aryl alcohol, wherein the aryl group is phenyl or phenyl substituted by a $C_1$–$C_{10}$ alkyl group.

6. The polishing composition according to claim 1, wherein said abrasive comprises aluminum oxide.

7. The polishing composition according to claim 1, wherein said polishing accelerator of component (c) comprises aluminum nitrate, aluminum sulfate or succinic acid.

8. The polishing composition according to claim 1, wherein said abrasive (d) comprises silicon dioxide having a particle size of from 0.005 to 0.5 $\mu$m.

9. The polishing composition according to claim 1, wherein said abrasive (d) comprises aluminum oxide having a particle size of from 0.01 to 2 $\mu$m.

10. The polishing composition according to claim 1, wherein said abrasive (d) comprises zirconium oxide having a particle size of from 0.01 to 2 $\mu$m.

11. The polishing composition according to claim 1, wherein said abrasive (d) comprises titanium oxide having a particle size of from 0.01 to 2 $\mu$m.

12. The polishing composition according to claim 1, wherein said abrasive (d) comprises silicon nitride having a particle size of from 0.01 to 2 $\mu$m.

13. The polishing composition according to claim 1, wherein said abrasive (d) comprises manganese dioxide having a particle size of from 0.01 to 2 $\mu$m.

14. The polishing composition according to claim 1, wherein said abrasive (d) comprises cerium oxide having a particle size of from 0.01 to 5 $\mu$m.

15. The polishing composition according to claim 1, wherein the content of the phosphate compound of component (b) is within a range of from 0.001 to 2 wt % based on the total weight of the composition.

16. The polishing composition according to claim 15, wherein said phosphate compound of component b) is present in an amount of from 0.01 to 0.6 wt %.

17. The polishing composition according to claim 1, wherein the content of the polishing accelerator of component (c) is within a range of from 0.01 to 30 wt % based on the total weight of the composition.

18. The polishing composition according to claim 17, wherein said polishing accelerator of component (c) is present in an amount of from 0.1 to 25 wt %.

19. The polishing composition according to claim 18, wherein said polishing accelerator of component (c) is present in an amount of from 0.5 to 20 wt %.

20. The polishing composition according to claim 1, wherein the content of the abrasive of component (d) is within a range of from 0.01 to 50 wt % based on the total weight of the composition.

21. The method of polishing a magnetic disk substrate, which comprises the step of polishing said magnetic disk with an effective amount of the polishing composition of claim 1.

* * * * *